(12) United States Patent
Wang et al.

(10) Patent No.: US 11,412,569 B2
(45) Date of Patent: *Aug. 9, 2022

(54) OPPORTUNISTIC BEAMFORMING

(71) Applicant: Google LLC, Mountain View, CA (US)

(72) Inventors: Jibing Wang, San Jose, CA (US); Erik Richard Stauffer, Sunnyvale, CA (US); Aamir Akram, San Jose, CA (US)

(73) Assignee: Google LLC, Mountain View, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 16/761,196

(22) PCT Filed: Dec. 13, 2018

(86) PCT No.: PCT/US2018/065557
§ 371 (c)(1),
(2) Date: May 1, 2020

(87) PCT Pub. No.: WO2019/118787
PCT Pub. Date: Jun. 20, 2019

(65) Prior Publication Data
US 2020/0275424 A1    Aug. 27, 2020

Related U.S. Application Data

(63) Continuation of application No. 15/842,241, filed on Dec. 14, 2017, now Pat. No. 10,608,721.

(51) Int. Cl.
*H04B 7/06* (2006.01)
*H04W 72/08* (2009.01)
(Continued)

(52) U.S. Cl.
CPC .......... *H04W 76/32* (2018.02); *H04B 7/0617* (2013.01); *H04B 7/0632* (2013.01);
(Continued)

(58) Field of Classification Search
CPC .... H04B 7/043; H04B 7/0617; H04B 7/0632; H04W 72/046; H04W 72/085
See application file for complete search history.

(56) References Cited

U.S. PATENT DOCUMENTS

| 5,543,811 A | 8/1996 | Chethik |
| 6,711,224 B1 | 3/2004 | Benning et al. |

(Continued)

FOREIGN PATENT DOCUMENTS

| CN | 102523034 | 6/2012 |
| CN | 102948103 | 2/2013 |

(Continued)

OTHER PUBLICATIONS

"3rd Generation Partnership Project", Technical Specification Group Radio Access Network; NR and NG-RAN Overall; 3GPP Standard; Technical Specification; 3GPP TS 38.300, 3rd Generation Partnership Project (3GPP), Mobile Competence Centre, Nov. 17, 2017, 56 pages.

(Continued)

*Primary Examiner* — Hoon J Chung
(74) *Attorney, Agent, or Firm* — Colby Nipper PLLC

(57) ABSTRACT

The present disclosure describes methods and apparatuses for beamforming for communication over preferred resources of a wireless network. A user device receives a signal from a plurality of antenna arrays of one or more base stations. The signal is transmitted, by the base stations, over a set of dedicated communication resources of a wireless network. Each of the base stations may dedicate a same set of resource elements for narrow-band communication with user devices outside of a standard range of a single antenna array. The user device determines a quality of the signal received over the dedicated communication resources and generates an index to identify preferred resources for communicating with the one or more base stations. The user (Continued)

device then communicates the index to the base stations to enable the base stations to establish a narrow-band wireless connection with the user device.

20 Claims, 9 Drawing Sheets

(51) Int. Cl.
| | |
|---|---|
| H04W 76/32 | (2018.01) |
| H04W 76/27 | (2018.01) |
| H04W 8/08 | (2009.01) |
| H04W 36/08 | (2009.01) |
| H04W 48/20 | (2009.01) |
| H04W 68/00 | (2009.01) |
| H04L 5/00 | (2006.01) |
| H04W 72/04 | (2009.01) |
| H04W 74/08 | (2009.01) |
| H04W 76/10 | (2018.01) |

(52) U.S. Cl.
CPC ............ *H04L 5/0048* (2013.01); *H04W 8/08* (2013.01); *H04W 36/08* (2013.01); *H04W 48/20* (2013.01); *H04W 68/005* (2013.01); *H04W 72/04* (2013.01); *H04W 72/046* (2013.01); *H04W 72/085* (2013.01); *H04W 74/0833* (2013.01); *H04W 76/10* (2018.02); *H04W 76/27* (2018.02)

(56) References Cited

U.S. PATENT DOCUMENTS

| | | | |
|---|---|---|---|
| 8,315,185 | B2 | 11/2012 | Chan |
| 8,346,286 | B2 | 1/2013 | Lee et al. |
| 8,543,063 | B2 | 9/2013 | Bergel et al. |
| 8,594,053 | B2 | 11/2013 | Kim et al. |
| 8,605,644 | B2 | 12/2013 | Wang |
| 8,774,150 | B1 | 7/2014 | Jeffery et al. |
| 8,923,192 | B2 | 12/2014 | Gong |
| 9,060,324 | B1 | 6/2015 | Goyal et al. |
| 9,204,441 | B2 | 12/2015 | Nagaraja et al. |
| 9,253,766 | B2 | 2/2016 | Yang et al. |
| 9,258,798 | B2 | 2/2016 | Li et al. |
| 9,271,290 | B2 | 2/2016 | Pelletier et al. |
| 9,332,456 | B2 | 5/2016 | Heo et al. |
| 9,414,430 | B2 | 8/2016 | Vajapeyam et al. |
| 9,425,923 | B2 | 8/2016 | Ratasuk et al. |
| 9,686,667 | B2 | 6/2017 | Artuso |
| 9,900,133 | B2 | 2/2018 | Lu et al. |
| 10,080,244 | B2 | 9/2018 | Lei et al. |
| 10,084,535 | B1 | 9/2018 | Speidel et al. |
| 10,148,329 | B2 | 12/2018 | Yue et al. |
| 10,375,671 | B2 | 8/2019 | Stauffer et al. |
| 10,560,887 | B2 | 2/2020 | Sundararajan et al. |
| 10,608,721 | B2 | 3/2020 | Wang et al. |
| 10,700,769 | B2 | 6/2020 | Wang et al. |
| 10,779,303 | B2 | 9/2020 | Wang et al. |
| 10,868,654 | B2 | 12/2020 | Wang et al. |
| 11,006,413 | B2 | 5/2021 | Wang et al. |
| 11,246,143 | B2 | 2/2022 | Wang et al. |
| 2005/0047322 | A1 | 3/2005 | Sondur |
| 2006/0205346 | A1 | 9/2006 | Evans et al. |
| 2007/0018630 | A1 | 1/2007 | Oehm |
| 2008/0018427 | A1 | 1/2008 | Ezra et al. |
| 2009/0102715 | A1 | 4/2009 | Lou et al. |
| 2009/0180451 | A1 | 7/2009 | Alpert et al. |
| 2010/0194650 | A1 | 8/2010 | Goransson et al. |
| 2010/0304680 | A1 | 12/2010 | Kuffner et al. |
| 2011/0002373 | A1 | 1/2011 | Jeon |
| 2011/0128866 | A1 | 6/2011 | Tian et al. |
| 2011/0205981 | A1 | 8/2011 | Koo et al. |
| 2011/0206001 | A1 | 8/2011 | Rexhepi et al. |
| 2011/0207494 | A1 | 8/2011 | Zhu et al. |
| 2012/0039280 | A1 | 2/2012 | Chen et al. |
| 2012/0140743 | A1 | 6/2012 | Pelletier et al. |
| 2012/0208547 | A1 | 8/2012 | Geirhofer et al. |
| 2012/0275384 | A1 | 11/2012 | Long et al. |
| 2012/0295623 | A1 | 11/2012 | Siomina et al. |
| 2013/0012141 | A1 | 1/2013 | Harnishfeger |
| 2013/0301454 | A1 | 11/2013 | Seol et al. |
| 2014/0146732 | A1 | 5/2014 | Olufunmilo et al. |
| 2014/0148107 | A1 | 5/2014 | Maltsev et al. |
| 2014/0213277 | A1 | 7/2014 | Jang |
| 2014/0362752 | A1 | 12/2014 | Jha et al. |
| 2015/0126239 | A1 | 5/2015 | Kim et al. |
| 2015/0208458 | A1 | 7/2015 | Pelletier et al. |
| 2015/0289147 | A1 | 10/2015 | Lou et al. |
| 2015/0349741 | A1 | 12/2015 | Lehtola et al. |
| 2015/0382205 | A1 | 12/2015 | Lee et al. |
| 2016/0029235 | A1 | 1/2016 | Kim et al. |
| 2016/0050002 | A1 | 2/2016 | Wei et al. |
| 2016/0072564 | A1 | 3/2016 | Li et al. |
| 2016/0076945 | A1 | 3/2016 | Huang et al. |
| 2016/0099763 | A1 | 4/2016 | Chen |
| 2016/0127997 | A1 | 5/2016 | Ang et al. |
| 2016/0135213 | A1 | 5/2016 | Zhu et al. |
| 2016/0179124 | A1 | 6/2016 | Madan et al. |
| 2016/0191132 | A1 | 6/2016 | Rajogopal et al. |
| 2016/0205679 | A1 | 7/2016 | Yoo et al. |
| 2016/0226640 | A1 | 8/2016 | Seol et al. |
| 2016/0234736 | A1 | 8/2016 | Kubota et al. |
| 2016/0242159 | A1 | 8/2016 | Ho et al. |
| 2016/0270027 | A1 | 9/2016 | Ang et al. |
| 2016/0277225 | A1 | 9/2016 | Frenne et al. |
| 2016/0286524 | A1 | 9/2016 | Griot et al. |
| 2016/0294531 | A1 | 10/2016 | Loehr et al. |
| 2016/0338064 | A1* | 11/2016 | Kuo ................... H04W 72/005 |
| 2016/0345189 | A1 | 11/2016 | Miyagawa et al. |
| 2016/0345234 | A1 | 11/2016 | Yang et al. |
| 2016/0353424 | A1 | 12/2016 | Stirling-Gllacher et al. |
| 2016/0379163 | A1 | 12/2016 | Johanson et al. |
| 2017/0026293 | A1 | 1/2017 | Desclos et al. |
| 2017/0026962 | A1 | 1/2017 | Liu et al. |
| 2017/0104561 | A1 | 4/2017 | Agardh et al. |
| 2017/0134913 | A1 | 5/2017 | Cui et al. |
| 2017/0149480 | A1 | 5/2017 | Kakishima et al. |
| 2017/0180095 | A1 | 6/2017 | Xue et al. |
| 2017/0195031 | A1 | 7/2017 | Onggonsanusi et al. |
| 2017/0201982 | A1 | 7/2017 | Alvarino et al. |
| 2017/0208589 | A1 | 7/2017 | Majjigi et al. |
| 2017/0223744 | A1 | 8/2017 | Qian et al. |
| 2017/0237783 | A1 | 8/2017 | Yang et al. |
| 2017/0257842 | A1 | 9/2017 | Hessler et al. |
| 2017/0264350 | A1 | 9/2017 | Sanderovich et al. |
| 2017/0310417 | A1 | 10/2017 | Jung et al. |
| 2017/0311285 | A1 | 10/2017 | Ly et al. |
| 2017/0331577 | A1 | 11/2017 | Parkvall et al. |
| 2017/0331670 | A1 | 11/2017 | Parkvall et al. |
| 2017/0347334 | A1 | 11/2017 | Akkarakaran et al. |
| 2017/0367046 | A1 | 12/2017 | Papasakellariou |
| 2017/0367069 | A1 | 12/2017 | Agiwal et al. |
| 2017/0374579 | A1 | 12/2017 | Wang et al. |
| 2018/0014251 | A1 | 1/2018 | Sambhwani et al. |
| 2018/0019843 | A1 | 1/2018 | Papasakellariou |
| 2018/0020462 | A1 | 1/2018 | Xiong et al. |
| 2018/0070282 | A1 | 3/2018 | Su et al. |
| 2018/0077612 | A1 | 3/2018 | Zheng et al. |
| 2018/0077734 | A1 | 3/2018 | Kim et al. |
| 2018/0103426 | A1 | 4/2018 | Nacer et al. |
| 2018/0109353 | A1 | 4/2018 | Kwak et al. |
| 2018/0139014 | A1 | 5/2018 | Xiong et al. |
| 2018/0139701 | A1 | 5/2018 | Wang et al. |
| 2018/0145732 | A1 | 5/2018 | Shen et al. |
| 2018/0184422 | A1 | 6/2018 | Cavalcanti et al. |
| 2018/0191415 | A1 | 7/2018 | Aryafar et al. |
| 2018/0199306 | A1 | 7/2018 | Stephen et al. |
| 2018/0206217 | A1 | 7/2018 | Martin et al. |
| 2018/0206268 | A1 | 7/2018 | Abdallah et al. |
| 2018/0213529 | A1 | 7/2018 | Lee et al. |
| 2018/0227902 | A1 | 8/2018 | Gholmieh et al. |
| 2018/0227960 | A1 | 8/2018 | Belghoul et al. |
| 2018/0242160 | A1 | 8/2018 | Morita et al. |

(56) References Cited

U.S. PATENT DOCUMENTS

| | | | |
|---|---|---|---|
| 2018/0279303 A1 | 9/2018 | Sun et al. | |
| 2018/0279324 A1 | 9/2018 | Wang et al. | |
| 2018/0295552 A1 | 10/2018 | Chakraborty et al. | |
| 2018/0332605 A1 | 11/2018 | Pelletier | |
| 2018/0343043 A1 | 11/2018 | Hakola et al. | |
| 2018/0367230 A1 | 12/2018 | Su et al. | |
| 2019/0007844 A1 | 1/2019 | Müller et al. | |
| 2019/0029005 A1 | 1/2019 | Bendlin et al. | |
| 2019/0037495 A1 | 1/2019 | Wilson et al. | |
| 2019/0037560 A1 | 1/2019 | Huang et al. | |
| 2019/0037586 A1 | 1/2019 | Park et al. | |
| 2019/0052419 A1 | 2/2019 | Yang et al. | |
| 2019/0058516 A1 | 2/2019 | Yang et al. | |
| 2019/0069321 A1 | 2/2019 | Akkarakaran et al. | |
| 2019/0089436 A1 | 3/2019 | Wei et al. | |
| 2019/0089506 A1 | 3/2019 | Takeda et al. | |
| 2019/0123798 A1 | 4/2019 | Lou et al. | |
| 2019/0132830 A1 | 5/2019 | Tabet et al. | |
| 2019/0141767 A1 | 5/2019 | Wang et al. | |
| 2019/0159140 A1 | 5/2019 | Wang et al. | |
| 2019/0173626 A1 | 6/2019 | Wang et al. | |
| 2019/0174433 A1 | 6/2019 | Nory et al. | |
| 2019/0174497 A1 | 6/2019 | Wang et al. | |
| 2019/0182816 A1* | 6/2019 | Choe | H04L 1/0003 |
| 2019/0182850 A1 | 6/2019 | Wang et al. | |
| 2019/0190577 A1 | 6/2019 | Wang et al. | |
| 2019/0190591 A1 | 6/2019 | Wang et al. | |
| 2019/0190641 A1 | 6/2019 | Wang et al. | |
| 2019/0190676 A1 | 6/2019 | Wang et al. | |
| 2019/0191440 A1 | 6/2019 | Wang et al. | |
| 2019/0200322 A1 | 6/2019 | Wang et al. | |
| 2019/0229789 A1 | 7/2019 | Zhang et al. | |
| 2019/0230603 A1 | 7/2019 | Liu et al. | |
| 2019/0230607 A1 | 7/2019 | Chung et al. | |
| 2019/0239168 A1 | 8/2019 | Li et al. | |
| 2019/0261380 A1 | 8/2019 | Iyer et al. | |
| 2019/0288809 A1 | 9/2019 | Iyer et al. | |
| 2019/0306830 A1 | 10/2019 | Wang et al. | |
| 2019/0342825 A1 | 11/2019 | Liu | |
| 2019/0349968 A1 | 11/2019 | Yerramalli et al. | |
| 2019/0356368 A1 | 11/2019 | Liu et al. | |
| 2019/0373557 A1 | 12/2019 | Agardh et al. | |
| 2019/0380140 A1 | 12/2019 | Wong et al. | |
| 2020/0028745 A1 | 1/2020 | Parkvall et al. | |
| 2020/0052782 A1 | 2/2020 | Wang et al. | |
| 2020/0374050 A1 | 11/2020 | Wang et al. | |

FOREIGN PATENT DOCUMENTS

| | | |
|---|---|---|
| CN | 103718497 | 4/2014 |
| CN | 106357321 | 1/2017 |
| CN | 106465336 | 2/2017 |
| CN | 106664127 | 5/2017 |
| CN | 107070610 | 8/2017 |
| EP | 3081041 | 10/2016 |
| EP | 3105958 | 12/2016 |
| EP | 3123802 | 2/2017 |
| EP | 3443704 | 2/2019 |
| KR | 20080062482 | 7/2008 |
| KR | 100860050 | 9/2008 |
| WO | 2010059926 | 5/2010 |
| WO | 2013070149 | 5/2013 |
| WO | 2015086215 | 6/2015 |
| WO | 2012074878 | 7/2015 |
| WO | 2016119882 | 8/2016 |
| WO | 2016133106 | 8/2016 |
| WO | 2016204811 | 12/2016 |
| WO | 2017011802 | 1/2017 |
| WO | 2017025366 | 2/2017 |
| WO | 2017030601 | 2/2017 |
| WO | 2017083514 | 5/2017 |
| WO | 2017088898 | 6/2017 |
| WO | 2017109549 | 6/2017 |
| WO | 2017111987 | 6/2017 |
| WO | 2017117340 | 7/2017 |
| WO | 2017127126 | 7/2017 |
| WO | 2017146773 | 8/2017 |
| WO | 2017150863 | 9/2017 |
| WO | 2017195463 | 11/2017 |
| WO | 2017196057 | 11/2017 |
| WO | 2017196243 | 11/2017 |
| WO | 2018031846 | 2/2018 |
| WO | 2018034998 | 2/2018 |
| WO | 2018064068 | 4/2018 |
| WO | 2019094078 | 5/2019 |
| WO | 2019112648 | 6/2019 |
| WO | 2019118020 | 6/2019 |
| WO | 2019118021 | 6/2019 |
| WO | 2019118023 | 6/2019 |
| WO | 2019118787 | 6/2019 |
| WO | 2019118915 | 6/2019 |
| WO | 2019126791 | 6/2019 |
| WO | 2019193768 | 10/2019 |

OTHER PUBLICATIONS

"3rd Generation Partnership Project; Technical Specification Group Radio Access Network", Evolved Universal Terrestrial Radio Access (E-UTRA) and NR; Multi-connectivity; Stage 2 (Release 15); 3GPP Standard; Technical Specification; 3GPP TS 37.340, 3rd Generation Partnership Project (3GPP), Mobile Competence Centre, Nov. 17, 2017, 49 pages.

"Dragonfly Narrowband IoT Unveiled with GNSS Option", GPS World Staff; Retrieved from http://gpsworld.com/dragonfly-narrowband-iot-unveiled-with-gnss-option/ on Dec. 7, 2017, Mar. 7, 2017, 5 pages.

"Evolved Universal Terrestrial Radio Access (E-UTRA)", 3rd Generation Partnership Project; Technical Specification Group Radio Access Network; Evolved Universal Terrestrial Radio Access (E-UTRA); Radio Resource Control (RRC); Protocol specification (Release 10), Mar. 2013, 307 pages.

et al., "Final Office Action", U.S. Appl. No. 15/833,312, dated Oct. 7, 2019, 15 Pages.

"Final Office Action", U.S. Appl. No. 15/842,318, dated Jul. 10, 2019, 15 Pages.

"Final Office Action", U.S. Appl. No. 15/939,060, dated Nov. 29, 2019, 17 pages.

"Final Office Action", U.S. Appl. No. 15/832,395, 23 Pages.

"First Action Interview Office Action", U.S. Appl. No. 15/842,318, dated May 7, 2019, 3 pages.

"First Action Interview Office Action", U.S. Appl. No. 15/844,093, dated Sep. 16, 2019, 4 Pages.

"First Action Interview Office Action", U.S. Appl. No. 16/142,952, dated Jan. 30, 2020, 6 Pages.

"International Preliminary Reporton Patentability", PCT Application No. PCT/US2018/049403, dated Mar. 13, 2020, 20 pages.

"International Preliminary Reporton Patentability", PCT Application No. PCT/US2018/046004, dated Jan. 23, 2020, 21 pages.

"International Preliminary Reporton Patentability", PCT Application No. PCT/US2018/067367, dated Mar. 17, 2020, 23 pages.

"International Search Report and Written Opinion", PCT Application No. PCT/US2018/046004, dated Nov. 22, 2018, 13 pages.

"International Search Report and Written Opinion", PCT Application No. PCT/2018/050487, dated Nov. 26, 2018, 13 pages.

"International Search Report and Written Opinion", PCT Application No. PCT/US2018/049407, dated Dec. 14, 2018, 18 pages.

"International Search Report and Written Opinion", PCT Application No. PCT/US2018/067367, dated Mar. 20, 2019, 19 pages.

"International Search Report and Written Opinion", PCT Application No. PCT/US2018/049403, dated Jan. 16, 2019, 21 pages.

"International Search Report and Written Opinion", PCT Application No. PCT/US2018/065829, dated Jun. 18, 2019, 28 pages.

"International Search Report and Written Opinion", PCT Application No. PCT/US2018/041696, dated Oct. 9, 2018, 30 pages.

"International Search Report and Written Opinion", PCT Application No. PCT/US2018/065557, dated Jun. 21, 2019, 38 pages.

"Invitation to Pay Additional Fees", PCT Application No. PCT/US2018/049403, dated Nov. 19, 2018, 13 pages.

(56) References Cited

OTHER PUBLICATIONS

"Invitation to Pay Additional Fees", PCT Application No. PCT/US2018/065829, dated Mar. 15, 2019, 13 pages.
"Invitation to Pay Additional Fees", PCT Application No. PCT/US2018/065557, dated Mar. 13, 2019, 19 pages.
"Leading the LTE IoT Evolution to Connect the Massive Internet of Things", Qualcomm, Inc., Jun. 2017, 41 pages.
"NB-IOT, Accelerating Cellular IOT", Huawei; Roads to MBB 2020 Building a Better Connected World; Global Mobile Broadband Forum 2015; Hong Kong, Nov. 2-5, 2015, 4 pages.
"Non-Final Office Action", U.S. Appl. No. 15/842,241, dated Mar. 11, 2019, 12 pages.
"Non-Final Office Action", U.S. Appl. No. 15/939,060, dated May 23, 2019, 15 pages.
"Non-Final Office Action", U.S. Appl. No. 15/832,395, dated Feb. 27, 2019, 18 pages.
"Non-Final Office Action", U.S. Appl. No. 15/832,395, dated Aug. 30, 2019, 20 Pages.
"Non-Final Office Action", U.S. Appl. No. 16/126,920, dated Jan. 29, 2020, 21 Pages.
"Non-Final Office Action", U.S. Appl. No. 16/105,948, dated Mar. 27, 2020, 21 Pages.
"Non-Final Office Action", U.S. Appl. No. 15/852,572, dated Sep. 14, 2018, 6 pages.
"Non-Final Office Action", U.S. Appl. No. 16/446,416, dated Oct. 18, 2019, 7 Pages.
"Notice of Allowance", U.S. Appl. No. 15/844,093, dated Mar. 2, 2020, 10 Pages.
"Notice of Allowance", U.S. Appl. No. 15/842,241, dated Dec. 5, 2019, 5 Pages.
"Notice of Allowance", U.S. Appl. No. 15/852,572, dated Mar. 11, 2019, 5 pages.
"Notice of Allowance", U.S. Appl. No. 15/842,241, dated Aug. 5, 2019, 6 pages.
"Notice of Allowance", U.S. Appl. No. 16/142,952, dated Feb. 28, 2020, 9 Pages.
"Pre-Interview Communication", U.S. Appl. No. 15/842,318, dated Mar. 29, 2019, 4 pages.
"Pre-Interview Communication", U.S. Appl. No. 15/833,312, dated Apr. 19, 2019, 4 pages.
"Pre-Interview Communication", U.S. Appl. No. 16/142,952, dated Dec. 20, 2019, 5 Pages.
"Pre-Interview Communication", U.S. Appl. No. 15/844,093, dated Jun. 28, 2019, 5 pages.
"Procedures Associated with Access and Operation of Uplink Common Packet Channel and the Associated Downlink Dedicated Control Channel", TSG-RAN WG 1#4 TSGR1#4(99) 371, Apr. 19-20, 1999, Yokohama, Japan, Apr. 1999, 10 pages.
"Restriction Requirement", U.S. Appl. No. 15/842,318, dated Oct. 4, 2018, 7 pages.
"Restriction Requirement", U.S. Appl. No. 15/852,572, dated Jun. 11, 2018, 9 pages.
"Written Opinion", PCT Application No. PCT/US2018/065557, dated Nov. 15, 2019, 4 pages.
"Written Opinion of the International Preliminary Examining Authority", PCT Application No. PCT/US2018/065557, dated Feb. 4, 2020, 13 pages.
"Written Opinion of the International Preliminary Examining Authority", PCT Application No. PCT/US2018/049407, dated Oct. 21, 2019, 8 pages.
"Written Opinion of the International Preliminary Examining Authority", PCT Application No. PCT/US2018/049403, dated Oct. 25, 2019, 8 pages.
"Written Opinion of the International Searching Authority", PCT Application No. PCT/US2018/046004, dated Oct. 21, 2019, 6 pages.
Dutta, et al., "Frame Structure Design and Analysis for Millimeter Wave Cellular Systems", avix.org; NYU Wireless, New York University Tandon School of Engineering, Aug. 20, 2016, 31 pages.

Gineste, et al., "Narrowband IoT Service Provision to 5G User Equipment Via a Satellite Component", 2017 IEEE GLOBECOM Workshops, IEEE, Dec. 4, 2017, Dec. 4, 2017, 4 pages.
Guidotti, Alessandro et al., "LTE-Based Satellite Communications in LEO Mega-Constellations", 2017 John Wiley & Sons, Ltd., 2017, 17 pages.
Jantti, Riku "Machine Type Communications for Internet of Things—Recent advances and future possibilities", WNCG; Seminar, Oct. 7, 2016, 1 page.
Landstrom, Sara et al., "NB-IOT: A Sustainable Technology for Connecting Billions of Devices", Ericsson Technology Review Standardizing Narrowband Iot, Apr. 22, 2016, 12 pages.
O'Hara, Kenneth M. et al., "Providing Narrowband IoT Coverage with Low Earth Orbit Satellites", 2019 Horizon House Publications, Inc., 2019, 4 pages.
Pederson, Klaus I. et al., "A Flexible Frame Structure for 5G Wide Area", Aalborg University, Proceedings of IEEE VTC Fall-2015, 2015, 6 pages.
Thales, et al., "FS_5GSAT, Draft Use Case, Internet of Things with a Satellite Component", 3GPP TSG-SA WG1 Meeting #80; S1-174441 Reno, Nevada, USA, 27 Nov.-Dec. 1, 2017, 2017, 2 pages.
"Foreign Office Action", European Application No. 18830637.7, dated Jul. 7, 2020, 7 pages.
"International Preliminary Report on Patentability", PCT Application No. PCT/US2018/041696, dated Jun. 18, 2020, 14 pages.
"International Preliminary Report on Patentability", PCT Application No. PCT/US2018/049407, dated Jun. 25, 2020, 12 pages.
"International Preliminary Report on Patentability", PCT Application No. PCT/US2018/065829, dated Jun. 25, 2020, 20 pages.
"International Preliminary Report on Patentability", PCT Application No. PCT/US2018/050487, dated Jun. 25, 2020, 8 pages.
"Non-Final Office Action", U.S. Appl. No. 15/833,312, dated Jun. 4, 2020, 17 Pages.
"Notice of Allowance", U.S. Appl. No. 15/844,093, dated May 13, 2020, 11 Pages.
"Corrected Notice of Allowability", U.S. Appl. No. 15/833,312, dated Jan. 7, 2021, 3 pages.
"Corrected Notice of Allowance", U.S. Appl. No. 15/844,093, dated Dec. 9, 2020, 3 pages.
"Non-Final Office Action", U.S. Appl. No. 15/844,093, dated Jan. 4, 2021, 12 pages.
"Notice of Allowance", U.S. Appl. No. 15/833,312, dated Dec. 8, 2020, 14 pages.
"Corrected Notice of Allowance", U.S. Appl. No. 15/833,312, dated Mar. 4, 2021, 3 pages.
"Corrected Notice of Allowance", U.S. Appl. No. 15/833,312, dated Mar. 30, 2021, 3 pages.
"Foreign Office Action", EP Application No. 18833358.7, dated Mar. 18, 2021, 11 pages.
"Foreign Office Action", KR Application No. 10-2020-7019139, dated May 21, 2021, 13 pages.
"Foreign Office Action", CN Application No. 201880063965.1, dated Jul. 1, 2021, 16 pages.
"Foreign Office Action", IN Application No. 202047026348, dated Aug. 13, 2021, 10 pages.
"Foreign Office Action", CN Application No. 201880070673.0, dated Aug. 27, 2021, 26 pages.
"FS 5GSAT, Draft Use Case, Internet of Things with a Satellite Component", 3GPP TSG-SA WG1 Meeting #80-S1-174570, Dec. 2017, 2 pages.
"Notice of Allowance", U.S. Appl. No. 15/844,093, dated Aug. 13, 2021, 16 pages.
"Notice of Allowance", U.S. Appl. No. 16/105,948, dated Aug. 26, 2020, 10 Pages.
"Notice of Allowance", U.S. Appl. No. 15/844,093, dated Sep. 16, 2020, 10 Pages.
"Foreign Office Action", KR Application No. 10-2020-7019139, dated Nov. 11, 2021, 6 pages.
"Foreign Office Action", EP Application No. 18833358.7, dated Nov. 26, 2021, 18 pages.
"Foreign Office Action", EP Application No. 18779905.1, dated Dec. 13, 2021, 4 pages.

(56) References Cited

OTHER PUBLICATIONS

"Non-Final Office Action", U.S. Appl. No. 16/769,195, dated Dec. 3, 2021, 22 pages.
"Foreign Office Action", KR Application No. 10-2020-7019139, dated Mar. 7, 2022, 6 pages.
"Foreign Office Action", CN Application No. 201880075011.2, dated Apr. 25, 2022, 16 pages.
"Foreign Office Action", EP Application No. 18833358.7, dated Jun. 9, 2022, 12 pages.

* cited by examiner

OPPORTUNISTIC BEAMFORMING

BACKGROUND

Wireless communication from a user device relies on a wireless connection between the user device and a network node, such as a base station of a wireless network provider. With advances in wireless standards and a demand for increased bandwidth for transmitting and receiving data, wireless network providers are transitioning toward operating in higher frequencies and providing wireless connections over wider frequency ranges. The higher-frequency wireless networks increase a rate of data communication at individual frequencies and the wider frequency ranges provide additional individual frequencies for increasing a total bandwidth of the wireless connection.

However, higher-frequency wireless networks, such as a $5^{th}$ generation new radio (5G NR) wireless network, are more susceptible to fading, reflection off objects, and signal distortion. This can lead to a decreased range when compared with other wireless networks, such as a $4^{th}$ generation long term evolution (4G LTE) wireless network. When the user device is out of range of the higher-frequency wireless network, it cannot communicate, regardless of the bandwidth that could be provided if the user device were in range.

SUMMARY

This document describes techniques for, and systems that enable, beamforming for communication over preferred resources of a wireless network. Different user devices may observe different channel qualities for each available resource in a manner that is unknown to a transmitting base station. Methods to capitalize on these differences so that overall channel quality is improved based on feedback from a given user device for each resource/channel are referred to as "opportunistic" beamforming. Thus, a base station can select a beamforming signal to use opportunistically based on which one is well-received by a user device responsive to feedback provided by the user device.

In some aspects, a user device receives a signal from a plurality of antenna arrays of one or more base stations. The signal is transmitted, by the base stations, over a set of dedicated communication resources of a wireless network. For example, each of the base stations dedicates a same set of resource blocks or resource elements for narrow-band communication with user devices outside of a standard range of a single antenna array of the plurality of antenna arrays. The user device determines a quality of the signal received over the dedicated communication resources and generates an index to identify preferred resources for communicating with the one or more base stations. The user device then communicates the index to the base stations to enable the base stations to establish a narrow-band wireless connection with the user device.

In some aspects, a base station of a wireless network dedicates a set of resource elements for narrow-band communication with one or more user devices outside of a standard range of a single antenna array of the plurality of antenna arrays. The dedicated set of resource elements are a same set of resource elements as dedicated by another base station. The resource elements include a portion, but not all of, at least one resource block. The base stations transmits, to a user device, a narrow-band signal over the dedicated set of resource elements. The base station then receives, from the user device, and based on the narrow-band signal, an index indicating preferred resources for communicating with the user device. Based on the index, the base station establishes a wireless connection with the user device over one or more of the preferred resource elements.

Narrow-band communication includes transmitting a narrow-band signal to a user device using fewer than all resource elements or subcarriers of a resource block. The narrow-band communication scheme allows for focusing a link budget, otherwise allocated for an entire resource block, on a narrow band of the resource block. This focus of the link budget increases a power spectral density of signals sent over the narrow band, which increases a range of the signals. For example, narrow-band communication may be implemented with one or more resource elements spanning 15 kHz of bandwidth, instead of typical wide-band allocations of 20 MHz to 1 GHz of bandwidth.

In some aspects, a system is provided comprising at least one user device (which may be at least one user device of any one of claims 9 to 15) and at least one base station of the present disclosure. In some aspects, a method is provided for beamforming (e.g., opportunistic beamforming) performed by a system of a wireless network, the system comprising at least one user device and at least one base station of the present disclosure. Such a method may comprise the method of any one of claims 1 to 8 and any one of claims 16 to 20.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of opportunistic beamforming for wireless networks is described below. The use of the same reference numbers in different instances in the description and the figures may indicate like elements.

DETAILED DESCRIPTION

Figure 1:
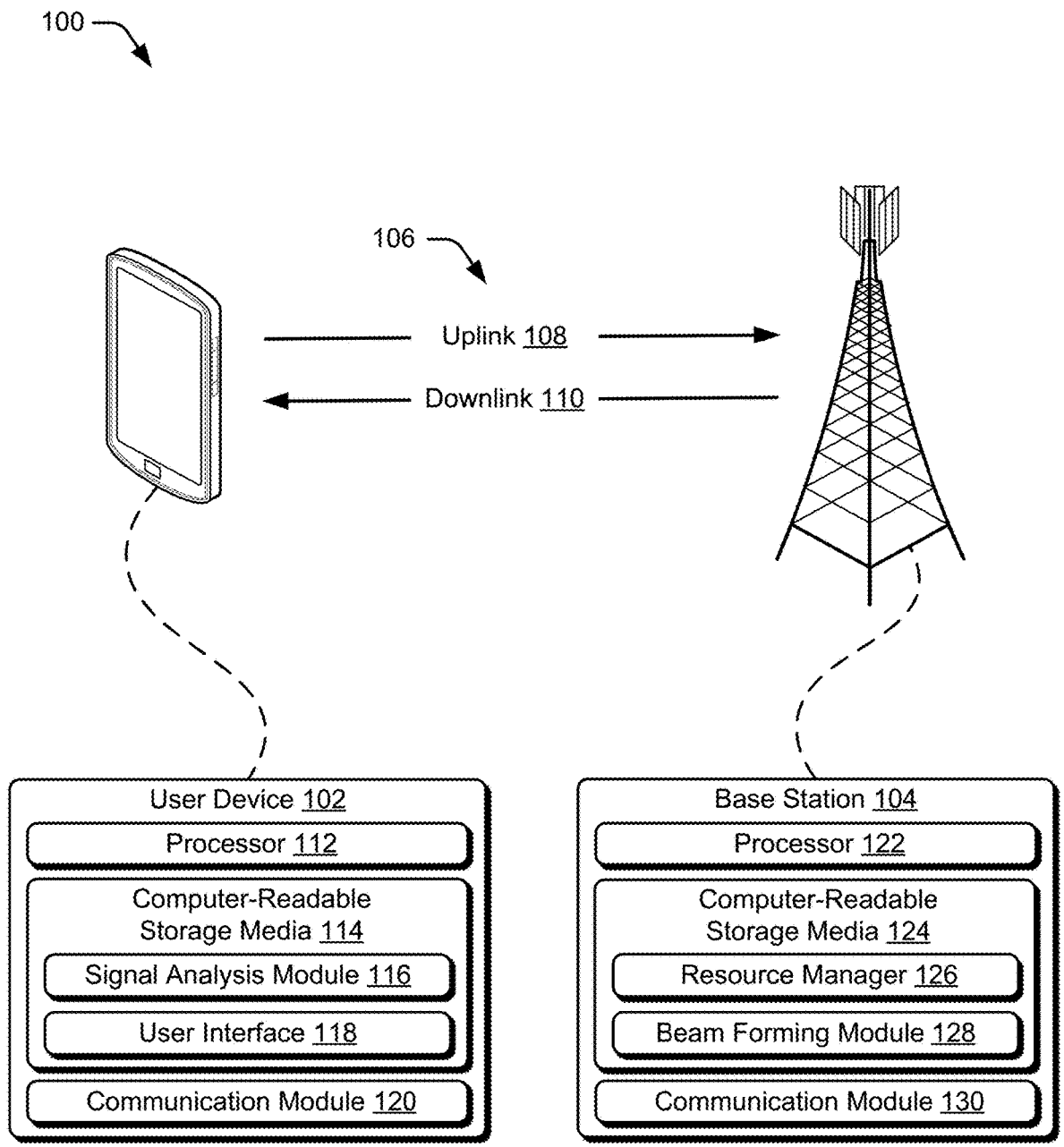
FIG. 1 illustrates example device configurations of a user device and a base station in accordance with one or more aspects opportunistic beamforming.

Generally, a user device communicates with a wireless network through a base station. Because cellular providers are transitioning toward operating wireless networks at high frequencies and over wide frequency ranges, conventional operation of base stations may result in a decreased signal range. This can result in high data transfer rates when the user device is within the signal range of the conventionally operated base station, and no data transferring when the user device is outside of the decreased signal range. To improve a signal range, multiple antenna arrays can be coordinated to beamform the signal for communication with the user device. Beamforming requires synchronizing timing, frequency, and phase to produce a signal with constructive interference at the location of the user device. Phase synchronization can be particularly resource-intensive and difficult to perform successfully.

This document describes techniques and systems for opportunistic beamforming between the user device and two or more antenna arrays. These techniques may include a user device receiving a signal from multiple antenna arrays that are located at one or more base stations. The user device analyzes a quality of the signal over various communication resources. Examples of a quality of a signal (or signal quality) include, but are not limited to, signal-to-noise ratio (SNR), bit error rate (BER), data transfer rate, combinations thereof, and so forth. The communication resources can be, for example, resource blocks spanning a frequency range and a time range. Based on the quality of the signal over the various communication resources, the user device selects one or more preferred resources for communicating with the two or more antenna arrays. For example, the user device may select each of the communication resources with a signal-quality above a threshold. Alternatively, the user device may prioritize multiple communication resources based on signal qualities. The user device generates an index indicating one or more of the preferred resources and communicates the index to the base stations.

In other aspects, a base station can dedicate a set of resource elements for narrow-band communication with user devices that are outside of a standard range of a single antenna array. As used herein, "standard range of a single antenna array" connotes a distance at which a signal that meets a given quality threshold can be achieved with a single antenna array using transmission parameters (e.g., transmit power or beamforming parameters) that comport with pertinent governmental regulations and applicable wireless specification provisions, which may be relative to a particular receiving device. If a user device is beyond this distance, the user device is outside of the standard range of the single antenna array. The dedicated set of resource elements is a same set of resource elements dedicated by at least one other base station for narrow-band communication with user devices that are outside of a standard range of a single antenna array. The base station transmits, to a user device, a narrow-band signal over the dedicated set of resource elements. The base station then waits for a response from the user device that indicates preferred resource elements for communicating with the user device. Based on the preferred resource elements, the base station establishes a wireless connection with the user device. In this way, the base stations can avoid using substantial computing resources to calculate which resource elements may be effective for communicating with the user device. Instead, the base station uses empirical data based on testing various resources for communication with the user device 102. However, aspects described herein may be applicable in circumstances in which a user device is within a standard range of a single antenna array.

The following discussion describes an operating environment, an example networking environment in which devices of the operating environment may be implemented, and techniques that may be employed in one or both of the operating environment or network environment. In the context of the present disclosure, reference is made to the operating environment or networking environment by way of example only.

Operating Environment

FIG. 1 illustrates an example operating environment 100 in which devices for opportunistic beamforming can be implemented. In this example, the operating environment includes a user device 102 and a base station 104 that are respectively configured to communicate over a wireless connection 106 of a wireless network. Generally, the wireless connection 106 includes an uplink 108 by which the user device 102 transmits data or information to the base station 104 and a downlink 110 by which the base station 104 transmits other data or other information to the user device 102. The wireless connection 106 may be implemented in accordance with any suitable protocol or standard, such as a Global System for Mobile Communications (GSM), Worldwide Interoperability for Microwave Access (WiMax), a High Speed Packet Access (HSPA), Evolved HSPA (HSPA+) protocol, an LTE protocol (e.g., 4G), an LTE Advanced protocol, or a $5^{th}$ generation new radio wireless network protocol (e.g., 5G NR protocol). An example 5G NR protocol is one or more technical specifications promulgated by the $3^{rd}$ Generation Partnership Project (3GPP) including Release 15 and subsequent releases. Although shown or described with reference to a separate uplink 108 or downlink 110, communication between the user device 102 and base station 104 may also be referred to as a wireless connection, wireless association, frame exchange, a wireless link, or a communication link.

The user device 102 includes a processor 112, computer-readable storage media 114 having a signal analysis module 116 and a user interface 118, and a communication module 120. The user device 102 is illustrated as a smart phone, however the user device may instead be implemented as any device with wireless communication capabilities, such as a mobile gaming console, a tablet, a laptop, an advanced driver assistance system (ADAS), a point-of-sale (POS) terminal, a health monitoring device, a drone, a camera, a media-streaming dongle, a wearable smart-device, an internet-of-things (IoT) device, a personal media device, a navigation device, a mobile-internet device (MID), a wireless hotspot, a femtocell, or a broadband router.

The processor 112 of the user device 102 can execute processor-executable instructions or code stored by the computer-readable storage media (CRM) 114 to cause the user device 102 to perform operations or implement various device functionalities. In some cases, the processor 112 is implemented as an application processor (e.g., multicore processor) or a system-on-chip with other components of the user device integrated therein. The CRM 114 may include any suitable type of memory media or storage media, such as read-only memory (ROM), programmable ROM (PROM), random access memory (RAM), static RAM (SRAM), or Flash memory. In the context of this discussion, the CRM 114 of the user device 102 is implemented as hardware-based storage media, which does not include transitory signals or carrier waves. In some cases, the CRM 114 stores one or more of firmware, an operating system, or applications of the user device 102 as instructions, code, or information. The instructions or code can be executed by the processor 112 to implement various functionalities of the user device 102, such as those related to network access or audio encoding features. In this example, the CRM 114 also stores processor-executable code or instructions for implementing one or more of the signal analysis module 116 or the user interface 118 the user device 102.

In some aspects, the signal analysis module 116 may analyze a signal-quality at multiple resources. For example, the user device 102 may receive a signal at multiple frequency-time locations. The multiple frequency-time locations may include resource elements of multiple resource blocks. The signal analysis module 116 can compare a signal-quality threshold with the signal at the multiple resources to determine which of the multiple resources carried the signal at a sufficiently high signal-quality. Additionally or alternatively, the signal analysis module 116 prioritizes multiple resources based on respective signal-qualities. Based on a signal-quality at the multiple resources, the signal analysis module 116 generates an index that indicates preferred resources for communication with the base station 104.

The index is transmitted to the base station 104 to establish a wireless connection between the base station 104 and the user device 102. The index may be transmitted as feedback to the base station 104 over one or more of the multiple resources, such as the preferred resources. For example, the signal may be received from the base station 104 as a narrow-band channel state information (CSI) reference signal for analysis by the signal analysis module 116. The signal analysis module 116 then generates the index for transmitting back to the base station 104 as a sounding reference signal (SRS) over the preferred resources.

Additionally or alternatively, the index may be transmitted via a physical random access channel (PRACH). For example, PRACH sequences may be partitioned based on beam indices, with multiple PRACH sequences corresponding to a same beam index. The user device 102 can communicate the index to the base station 104 by randomly selecting a PRACH sequence from sequences partitioned for a preferred beam index. In another example, the user device 102 uses the preferred beam index to seed a sequence used to scramble the PRACH sequence. The base station 104 then decodes the PRACH sequence to determine the preferred beam index.

The user interface 118 may provide a notification of entering enter an opportunistic beamforming mode. Additionally or alternatively, the user interface 118 may provide a menu for receiving a selection to enter an opportunistic beamforming mode. These are but a few implementations of the signal analysis module 116 and the user interface 118, which are described further or with other aspects throughout the disclosure.

The communication module 120 of the user device 102 includes a hardware-based transceiver and associated circuitry or other components for communicating with the base station 104 via a wireless medium. For example, the communication module 120 may transmit, via a transmitter of the transceiver, data or information to the base station 104 via the uplink 108. This data or information transmitted to the base station 104 may include any suitable type of framed or packetized information, such as a device location, an SRS signal, a PRACH communication, device status information, wireless connection status information, wireless connection control information, data requests, data, or network access requests. The communication module 120 may also receive, via a receiver of the transceiver, other data or other information from the base station 104, such as a CSI reference signal, wireless connection configuration settings, network control information, or a communication mode selection.

In this example, the base station 104 is shown generally as a cellular base station of a wireless network. The base station 104 may be implemented to manage a cell of a wireless network that includes multiple other base stations that each manage another respective cell of the wireless network. As such, the base station 104 may communicate with a network management entity or others of the multiple base stations to coordinate connectivity, hand-offs, beamforming, and dedication of resources for opportunistic beamforming among the multiple base stations. The base station 104 can be configured as any suitable type of base station or network management node, such as GSM base station, a node base (Node B) transceiver station (e.g., for UMTS), an evolved NodeB (eNB, e.g., for LTE), or a next generation Node B (gNB, e.g., for 5G NR). As such, the base station 104 may control or configure parameters of the uplink 108 or the downlink 110 in accordance with one or more wireless standards or protocols.

The base station 104 includes a processor 122, a computer-readable storage media (CRM) 124 having a resource manager 126 and a beamforming module 128, and a communication module 130. The processor 122 can execute processor-executable instructions or code stored by the CRM 124 to perform operations or implement various base station functionalities. In some cases, the processor 122 is implemented as multiple processor cores or a multicore processor configured to execute firmware or an operating system of the base station 104. The CRM 124 may include any suitable type of memory media or storage media, such as ROM, PROM, RAM, SRAM, or Flash memory. In the context of this discussion, the CRM 124 is implemented as hardware-based storage media, which does not include transitory signals or carrier waves. The CRM 124 of the base station 104 may store firmware, an operating system, or applications of the base station as instructions, code, or other information. The instructions or code can be executed by the processor 122 to implement various functionalities of the base station 104, such as to manage connectivity or parameters of the wireless connection 106 with the user device 102. In this example, the CRM 124 also stores processor-executable code or instructions for implementing the resource manager 126 and the beamforming module 128 of the base station 104.

In some aspects, the resource manager 126 of the base station 104 is implemented to perform various functions associated with allocating physical access (e.g., resource blocks) or communication resources available to the base station 104. The resource manager 126 may dedicate common frequency resources for opportunistic beamforming. Additionally or alternatively, the resource manager 126 may dedicate common subframes or slots for opportunistic beamforming The dedicated resources may also be dedicated by one or more other base stations such that multiple base stations utilize a common set of resources for opportunistic beamforming. In this way, multiple base stations may transmit a signal, such as a CSI reference signal, over the common resources. Because multiple base stations transmit the signal, the user device 102, and other user devices, can receive the signal from the multiple base stations. Based on constructive or destructive interference from the transmissions from the multiple base stations, the signal can be amplified or diminished at different physical locations. Additionally, the signal can be amplified at some resources and diminished at other resources based on, for example, a frequency of the resources and a distance between the user device and the multiple base stations.

The resource manager 126 may use narrow-band communication to transmit the signal over the dedicated common subframes or slots. Using narrow-band resources for transmitting the signal can increase a range, or signal-quality at long distances, of the base station 104. The narrow-band transmission allows for focusing a transmission power, otherwise allocated for an entire resource block, on a narrow band of each of multiple resource blocks. This focus of the transmission power increases a power spectral density of the signal sent within the narrow bands, which increases a range of the transmission. For example, narrow-band communication may be implemented using one or more resource elements spanning 15 kHz or 180 kHz of bandwidth within a resource block, instead of typical wide-band allocations of 20 MHz to 1 GHz of bandwidth.

The resource manager 126 receives, via the communication module 130, an index indicating preferred resources for communication with the user device 102. For example, the resource manager 126 may receive an index that indicates a high signal-quality for communicating with the user device 102 over resources having a preferred frequency. Additionally or alternatively, the index indicates a high signal-quality for communicating with the user device 102 over resources within a preferred subframe or slot. Based on the index, the resource manager 126 assigns resources for communicating with the user device 102 and establishes the wireless connection 106.

The beamforming module 128 receives the assignment of resources from the resource manager 126 and beamforms an identification of the assigned resources to the user device 102 via the downlink 110. To beamform, the beamforming module 128 coordinates an antenna array of the communication module 130 to transmit the signal in a direction toward the user device 102. To transmit in a desired direction, the beamforming module 128 causes a phase change of the signal transmitted via the antennas of the antenna array such that constructive interference occurs in the desired direction.

The identification of the assigned resources may include one or both of frequencies or time locations of the assigned resource elements. The one or both of frequencies or time locations may be effective to enable the user device 102 to communicate in a narrow-band mode via the selected resource elements. In such an instance, the indication may be communicated from the base station 104 to the user device 102 as part of a Radio Resource Control (RRC) message or Downlink Control Information (DCI) message.

The communication module 130 of the base station 104 includes a receiver, a transmitter, and associated circuitry or other components for communicating with the user device 102 via the wireless medium. In some cases, the communication module 130 includes, or is coupled with, multiple hardware-based transceivers and antenna arrays that are configured to establish and manage wireless connections with multiple user devices. The base station 104 may communicate any suitable data or information to the user device 102 through the downlink 110, such as a schedule of allocated resource elements, data, wireless connection status information, or wireless connection control information.

Figure 2:
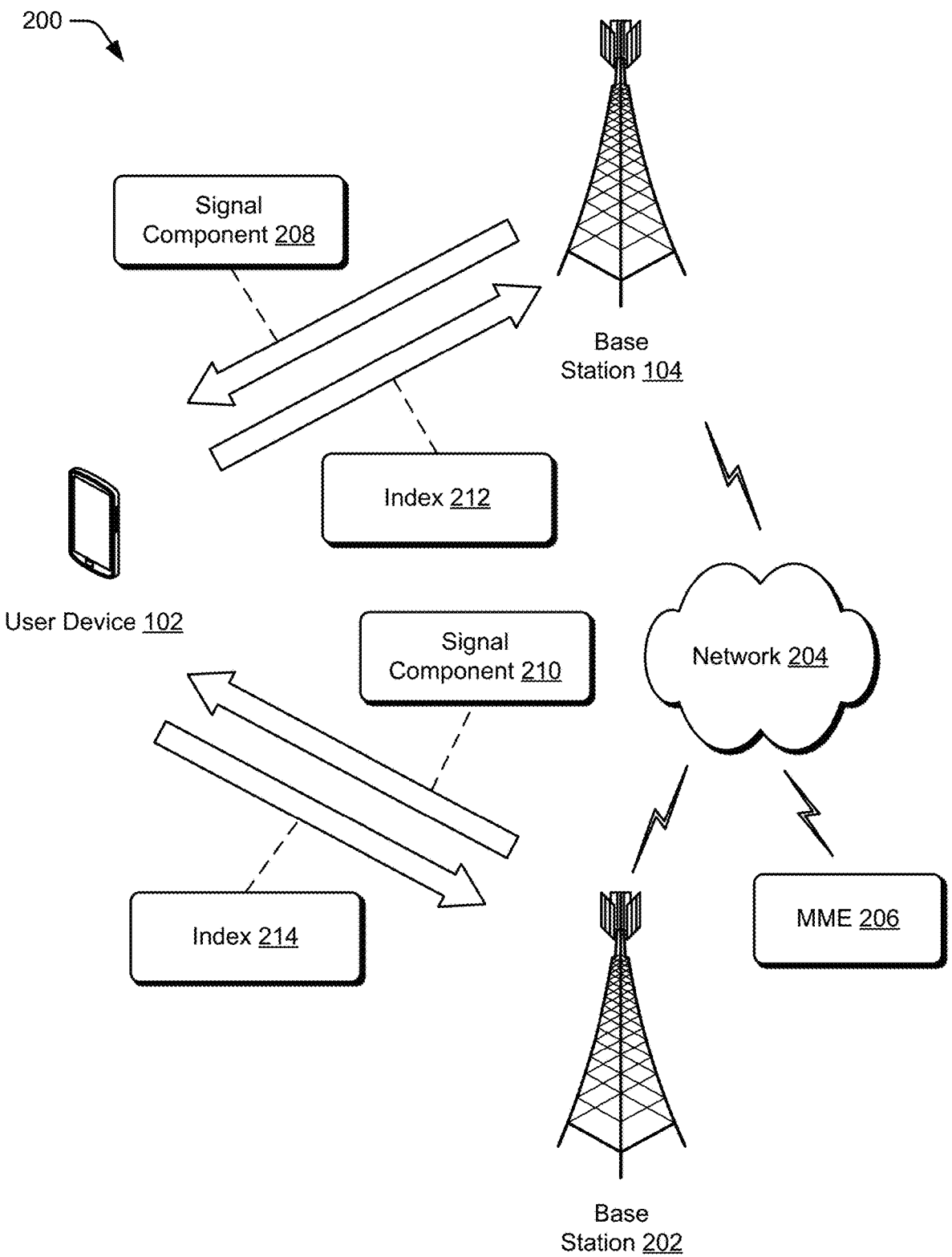
FIG. 2 illustrates an example networking environment in which the user device and a system of base stations may communicate in accordance with one or more aspects of opportunistic beamforming.

FIG. 2 illustrates an example networking environment 200 in which a user device and two base stations may communicate via opportunistic beamforming. The networking environment 200 includes respective instances of the user device 102 and the base station 104 that provides the wireless connection 106 along with a second base station 202 of a wireless network. Through the wireless network, the base stations 104 and 202 may provide access to other networks or resources, such as a network 204 (e.g., the Internet) connected via a backhaul link (e.g., fiber network). Additionally or alternatively, the networking environment 200 may include additional base stations or a mobility management entity (MME) 206 to manage the base stations of the wireless network and provide an area wide wireless network, such as a multi-component carrier network, and associated data services. For example, the MME 206 may manage the base station 104 and the base station 202 such that both dedicate common resources for opportunistic beamforming.

In the context of opportunistic beamforming, the base station 104 transmits a signal component 208 and the base station 202 transmits a signal component 210 to the user device 102. The signal components 208 and 210 are transmitted over dedicated resources of the wireless network that are used for opportunistic beamforming. When transmitting the signal components 208 and 210, respectively, the base stations 104 and 202 may use different beamforming weights to direct the signal components 208 and 210 toward the user device 102. The user device 102 receives the signal components 208 and 210 as if they are a single signal based on superposition of the waves carrying the signal components 208 and 210. The signal components 208 and 210 may interfere constructively or destructively at a location of the user device 102, which interference results in amplifying or diminishing the signal.

The user device 102 analyzes the single signal to determine preferred resources for communicating with the base stations 104 and 202. For example, the user device 102 determines, based on a high signal-quality, that the signal components interfere constructively at a preferred frequency. Based on the analysis of the single signal, the user device 102 generates indices 212 and 214 that indicate the preferred resources to the base stations 104 and 202. The indices 212 and 214 may be a same index or may be different indices that indicate the same preferred resources. Upon receiving the indices 212 and 214, the base stations 104 and 202 establish the wireless connection 106 with the user device 102.

Figure 3:
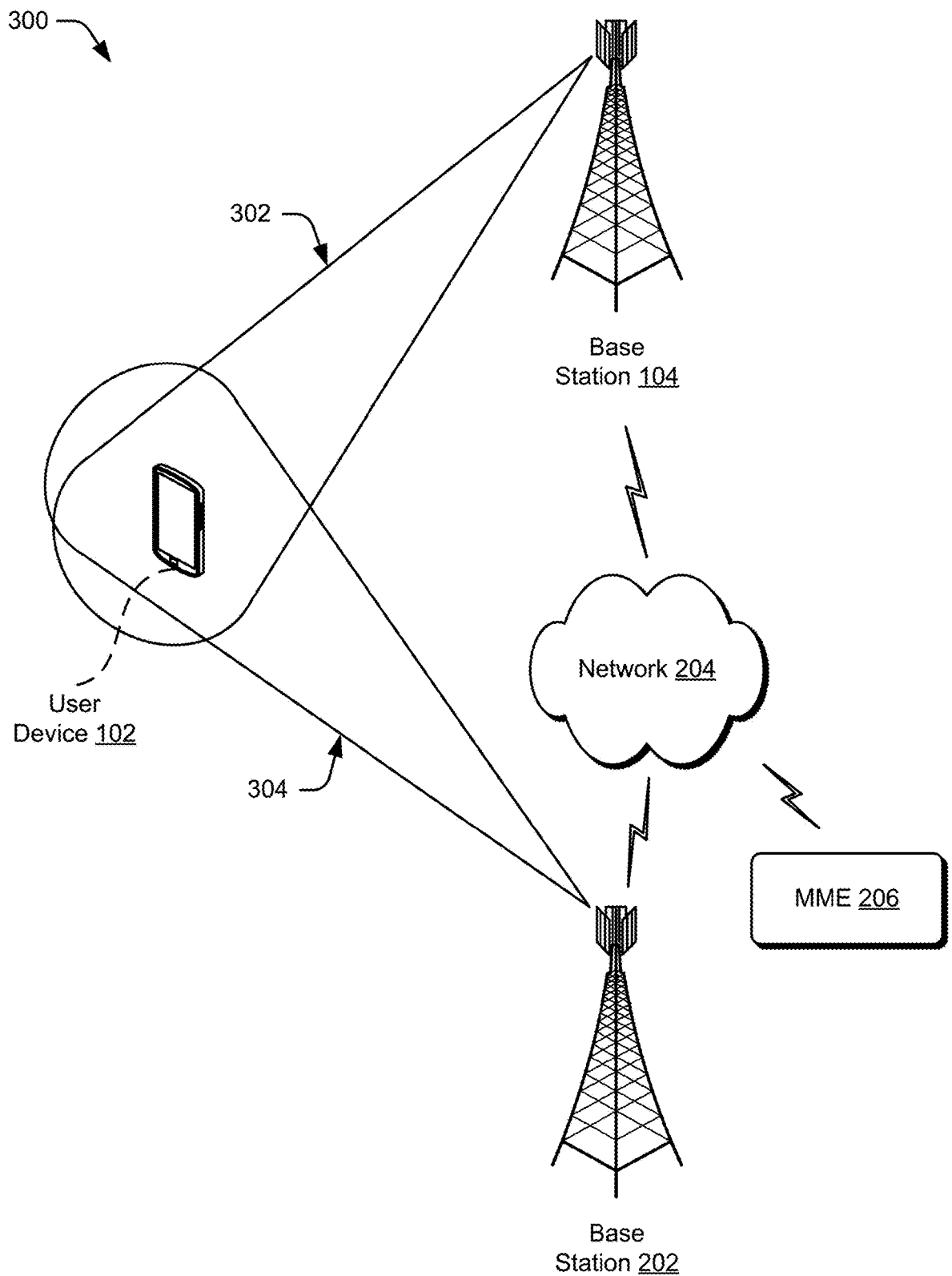
FIG. 3 illustrates an example networking environment illustrating beamforming by a system of base stations for communicating with a user device in accordance with one or more aspects of opportunistic beamforming.

FIG. 3 illustrates an example networking environment 300 illustrating beamforming by a system of base stations for communicating with a user device. The networking environment 300 includes respective instances of the user device 102, the base station 104, the base station 202, the network 204 and the MME 206 that provide a wireless connection for communicating via the wireless connection 106. In this example, the base station 104 provides a beam 302 for communicating with the user device 102. The base station 202 provides another beam 304 for communicating with the user device 102.

The MME 206 may coordinate the base stations 104 and 202 to communicate with the user device 102 over common resources, such as resource blocks having specified times and frequencies. The base stations 104 and 202 may determine a direction for beamforming based on a global positioning system (GPS) location of the user device 102. Thus, the base stations 104 and 202 may be synchronized based on location, time, and frequency for beamforming to the user device 102. However, if the wireless connection 106 is assigned a set of resources without considering phase synchronization, the user device 102 may receive a diminished superposed signal at the assigned resources. This can result in a low signal-quality of the superposed signal or a loss of reception by the user device 102.

The phase synchronization can be based in part on initial phase shifting at the base stations 104 and 202 for forming the beams 302 and 304 in the direction of the user device 102. Additionally or alternatively, the phase synchronization can be based in part on respective distances between the user device 102 and the base stations 104 and 202.

To synchronize phases of the beams 302 and 304, a precise location of the user device 102 can be used to calculate a phase shift of one or more of the beams 302 or 304. However, the precise location is difficult to determine Additionally, it may be difficult to shift a phase of the beams 302 or 304 without changing a direction of the beams 302 or 304. Further, calculating an appropriate phase shift that would allow the beams 302 and 304 to maintain a desired direction may be computing-resource intensive and inaccurate based on interference from unknown sources.

In the context of opportunistic beamforming, the base station 104 and the base station 202 transmit a signal, such as the signal components 208 and 210, to be used by the user device 102 to determine a desired index of resources to use for communication. The signal is transmitted over multiple resources, such as resource blocks at various frequencies, to provide options to the user device 102 for selecting preferred resources. The user device 102 communicates the index to the base stations 104 and 202 to instruct the base stations 104 and 202 to select resources for the wireless connection 106 based on the index. In this way, the MME 206 and the base stations 104 and 202 need not use computing resources to calculate which communication resources may be effective for communicating with the user device 102. Instead, the base stations 104 and 202 use empirical data based on testing various resources for communication with the user device 102.

Figure 4:
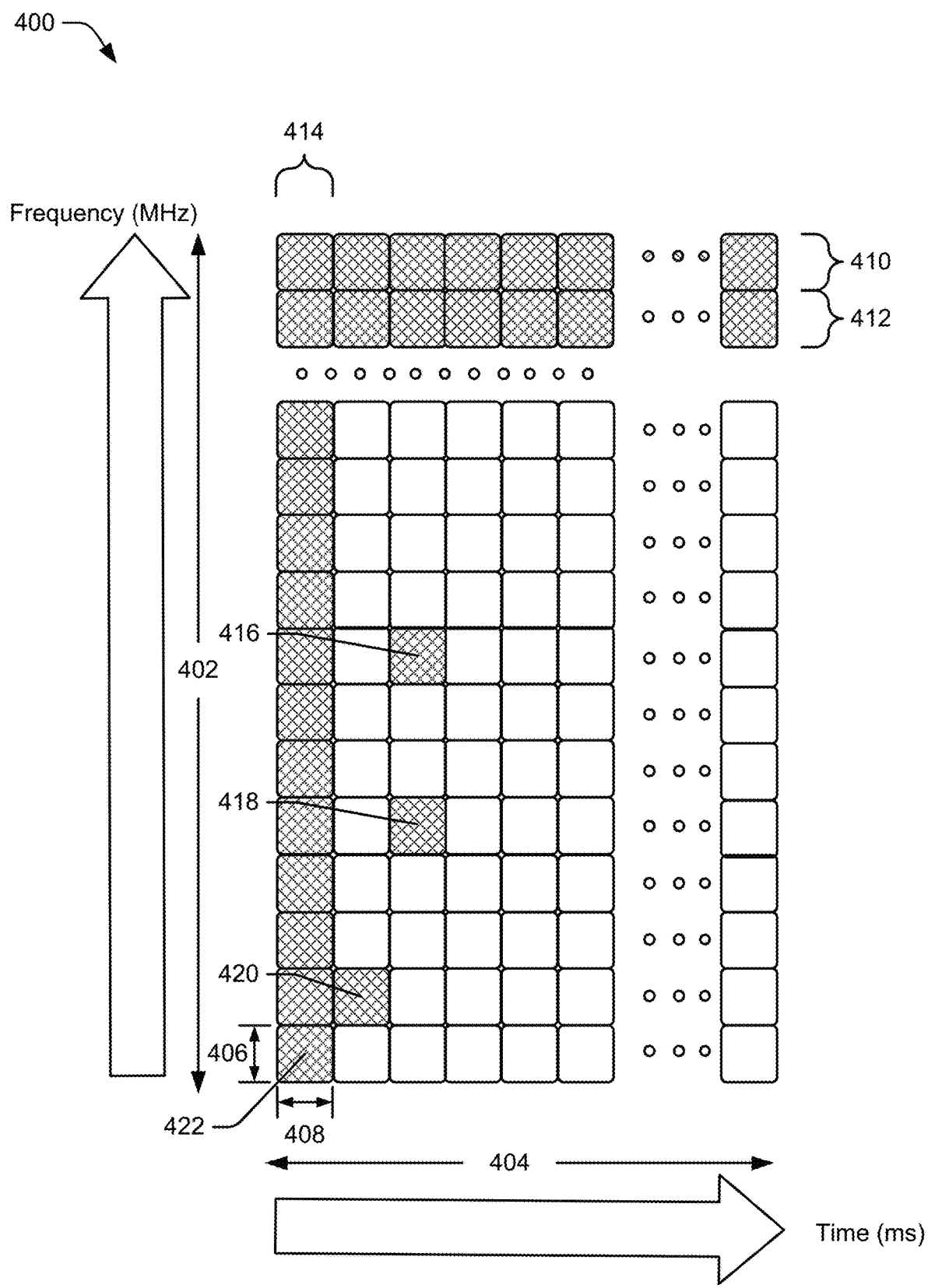
FIG. 4 illustrates an example set of resources of a wireless network that are available to a base station for communication with one or more user devices.

FIG. 4 illustrates an example set 400 of resource blocks available to one or more of the base stations 104 or 202 for communication with one or more user devices of a wireless network. The set 400 of resource blocks spans a frequency range 402 and a time range 404. Resource blocks of the set 400, as defined by a communication protocol or standard, span a specified frequency range 406 and a specified time interval 408. For example, each resource block of sets 410 and 412 of common-frequency resource blocks may span approximately 180 KHz of bandwidth. Similarly, each resource block of set 414 of common-time interval resource blocks may span a time slot of approximately one-half millisecond.

Some of the resources may be dedicated for opportunistic beamforming. For example, the resource blocks 416, 418, 420, 422, and the resource blocks of the sets 410, 412, and 414 may be dedicated for opportunistic beamforming Referring back to FIG. 2, the base stations 104 and 202 may dedicate a set 414 of common-time interval resource blocks for transmitting the signal components 208 and 210 over several frequencies. When the base stations 104 and 202 receive the indices 212 and 214 indicating preferred resources for communicating with the user device 102, the base stations may establish the wireless connection 106 with the user device 102 using another resource block having a same frequency as the preferred resources. For example, if the indices 212 and 214 indicate a preference for a resource block in the set 414 that has a same frequency as the resource block 416, the wireless connection 106 may be established using the resource block 416.

In some implementations, the wireless connection 106 may include additional resource blocks having a same frequency as the preferred resources. For example, the index may indicate a preference for resources having a same frequency as the resource blocks 416 and 418 based on the signal transmitted over corresponding resource blocks within the set 414. The wireless connection 106 may then be established using the resource blocks 416 and 418.

Additionally or alternatively, the base stations 104 and 202 may dedicate a set 410 of common-frequency range resource blocks for transmitting the signal components 208 and 210 over several time intervals. When the base stations 104 and 202 receive the indices 212 and 214 indicating preferred resources for communicating with the user device 102, the base stations may establish the wireless connection 106 with the user device 102 using another resource block having a same time interval as the preferred resources. For example, if the indices 212 and 214 indicate a preference for a resource block in the set 410 that has a same time interval as the resource block 420, the wireless connection 106 may be established using the resource block 420.

In these examples, a set of the dedicated resources are used for sending test signals, such as a CSI reference signal, to determine one or more of preferred frequencies or preferred time intervals for the wireless connection 106. Once the preferences of the user device 102 are received, the resource manager 126 matches the preferences to an available set of resources. The matched resources may also be dedicated for opportunistic beamforming by being available for matching to preferences of the user device 102.

Alternatively, the signal is transmitted over available resources that are dedicated for opportunistic beamforming. When the base stations 104 and 202 receive the index indicating preferred resources for communicating with the user device 102, the base stations 104 and 202 assign one or more of the preferred resources to the wireless connection 106. The assigned resources are removed from a set of available resources, and the base stations 104 and 202 may again transmit the signal on remaining available resources to allow additional user devices to determine preferred resources for establishing another wireless connection.

Figure 5:
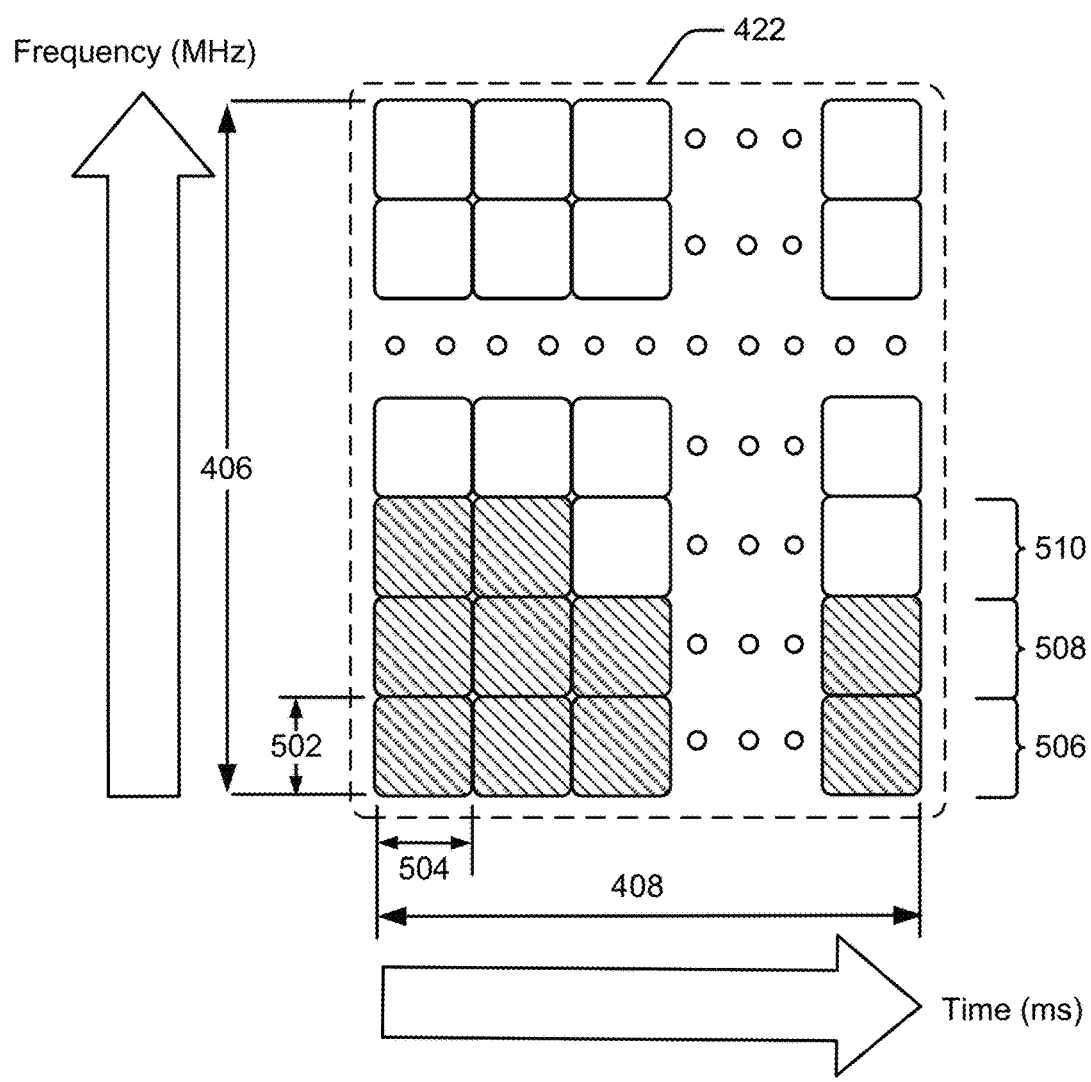
FIG. 5 illustrates a detailed example of a resource block that may be implemented as one of the resources of FIG. 4.

FIG. 5 illustrates a detailed example 500 of one of the resource blocks 422 as shown in FIG. 4. In this example, the resource block 422 is divided into resource elements that each span a portion 502 of the specified frequency range 406 and a subinterval 504 of the specified time interval 408. Subcarriers 506, 508, and 510 include resource elements within a common portion of the specified frequency range. For example, a subcarrier may span a 15 kHz portion 502 of the specified frequency range 406 (e.g., 180 kHz) of the resource block 422. Each subcarrier is divided into a plurality of resource elements (illustrated as blocks), that correspond to a symbol or subinterval 504 of the specified time interval 408.

In accordance with various aspects of narrow-band opportunistic beamforming, the resource manager 126 of the base station 104 may select subcarriers or resource elements of the resource block 422 on a granular level by which the user device 102 can communicate in a narrow-band mode. The resource manager 126 may select one or a few, but not all, subcarriers of the resource block 422 for narrow-band communication. For example, the resource manager 126 may select each of the subcarriers 506 and 508 and a portion of the subcarrier 510, each spanning 15 kHz, for use in narrow-band communication, instead of a wide-band frequency allocation of an entire resource block (e.g., 180 kHz) or multiple resource blocks (e.g., 1 GHz).

The fewer resource elements that are allocated, the longer the range capabilities of the wireless connection 106 based on a power spectral density of signals sent via the allocated resource elements. However, with fewer resource elements allocated, a bandwidth of the wireless connection 106 decreases. Therefore, the base stations 104 and 202 may be configured to determine a maximum quantity of resource elements to use in a narrow-band mode such that the signal transmitted over the resource elements produces a sufficiently high signal-quality at the user device 102. The techniques described herein for opportunistic beamforming between multiple base stations may increase a signal strength of a superposed signal to allow for an increase quantity of resource elements used in narrow-band communication.

Figure 6:
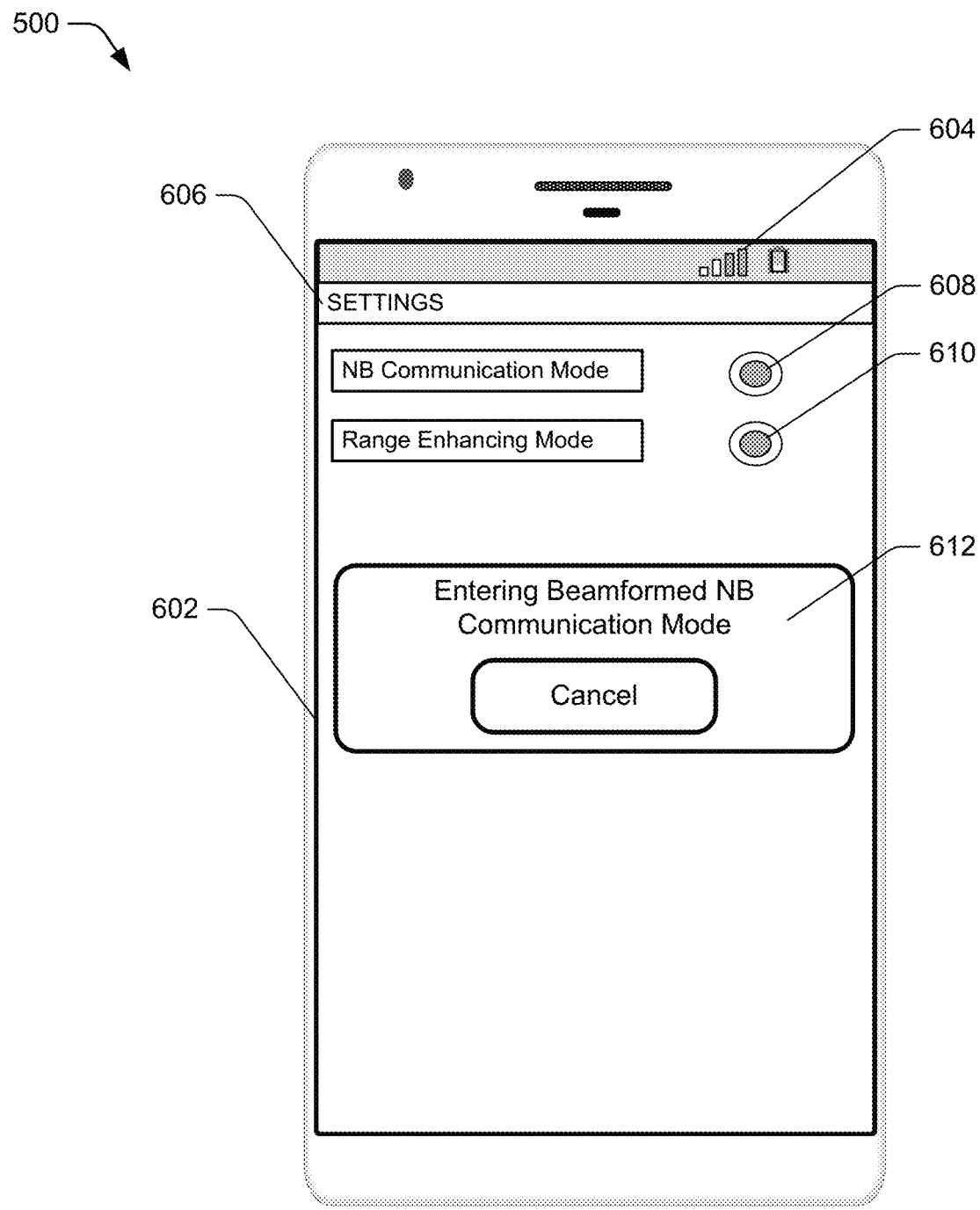
FIG. 6 illustrates an example user interface of a user device through which one or more aspects of narrow-band communication can be implemented.

FIG. 6 illustrates an example user interface 600 of a user device through which one or more aspects of opportunistic beamforming can be implemented. In this example, the user interface 600 is presented through a visible portion of a display 602 for providing output to a user. The display 602 may also include, or be integrated with, a touch screen or touch-sensitive overlay for receiving touch input from the user. The display 602 may also display a signal-quality indicator 604 of a wireless connection. In this example, the signal-quality indicator 604 of the wireless connection indicates a low signal-quality.

In some cases, the display 602 provides, or makes accessible, a settings menu 606 through which the user interface 600 can receive an input 608 to select a narrow-band (NB) communication mode or an input 610 to select range enhancing mode. The input 608 and 610 can be effective to cause the user device 102 to enter a beamformed narrow-band communication mode.

The user device 102 may provide a notification 612 via the user interface 600 to indicate that the user device 102 is entering the beamformed narrow-band communication mode. The notification 612 is illustrated in this example as a pop-up notification in the display 602, however, other forms of notification 612 may be implemented in addition or in alternative to the pop-up notification. For example, the user device 102 may provide an audible notification, a visible notification via a light emitting diode (LED) indicator that is separate from the display 602, or a motion-based notification such as a vibration of the user device 102.

The user interface 600 is but one of many possible user interfaces for implementing opportunistic beamforming Although the user device 102 is illustrated as a smart phone with a touch screen, alternative user interfaces may be implemented by the user device 102. For example, the user device 102 may be implemented as a laptop with a user interface including, for example, one or more of a mouse, a track pad, a keyboard, a microphone, a monitor, a projector screen, or speakers. In some implementations, the user interface 600 does not require accessing the settings menu 606 for receiving the inputs 608 or 610, but rather, the user device 102 enters the narrow-band communication mode automatically and without receiving user input.

Techniques for Opportunistic Beamforming

Figure 7:
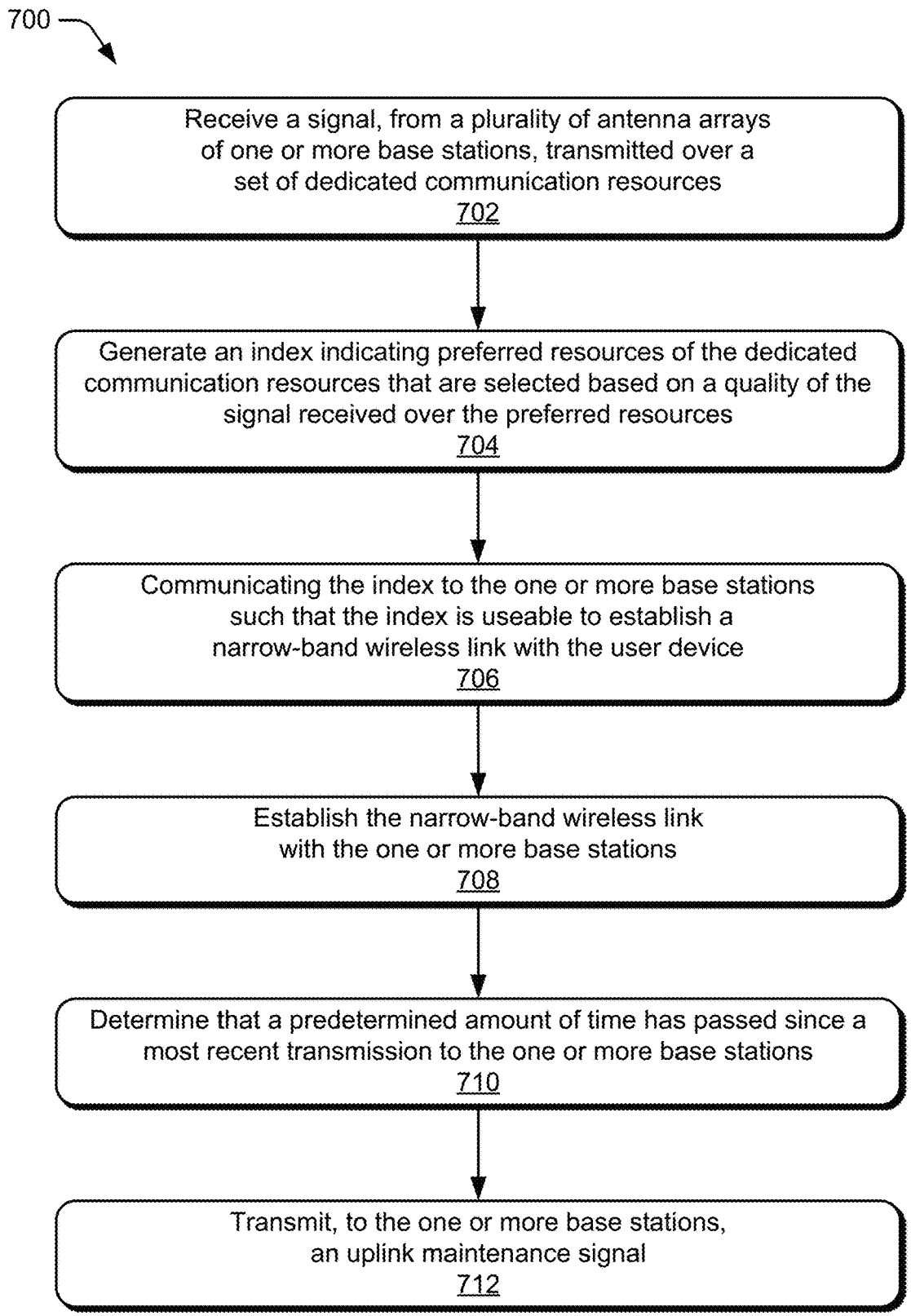
FIG. 7 illustrates an example method for opportunistic beamforming.
Figure 8:
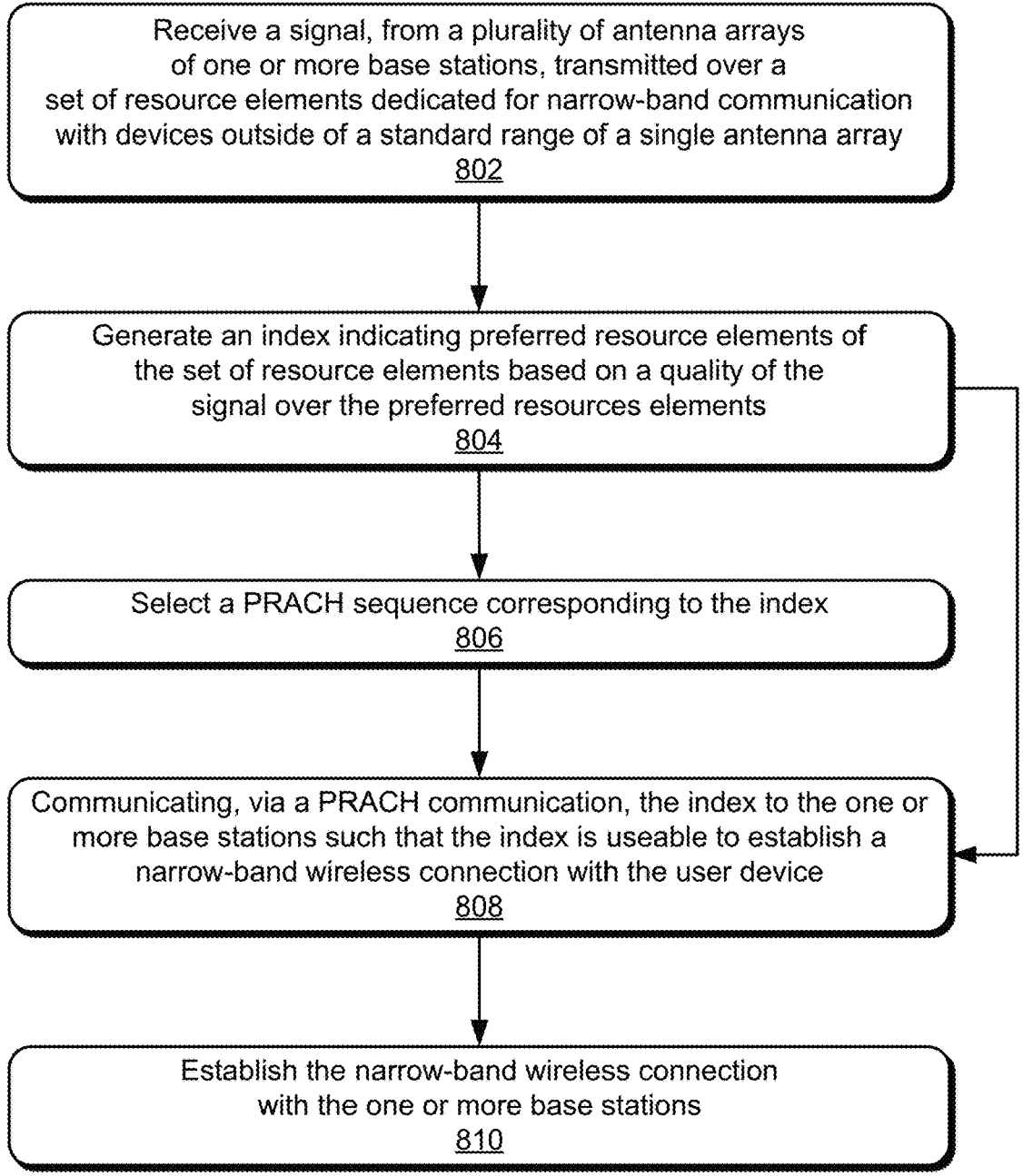
FIG. 8 illustrates another example method for opportunistic beamforming.
Figure 9:
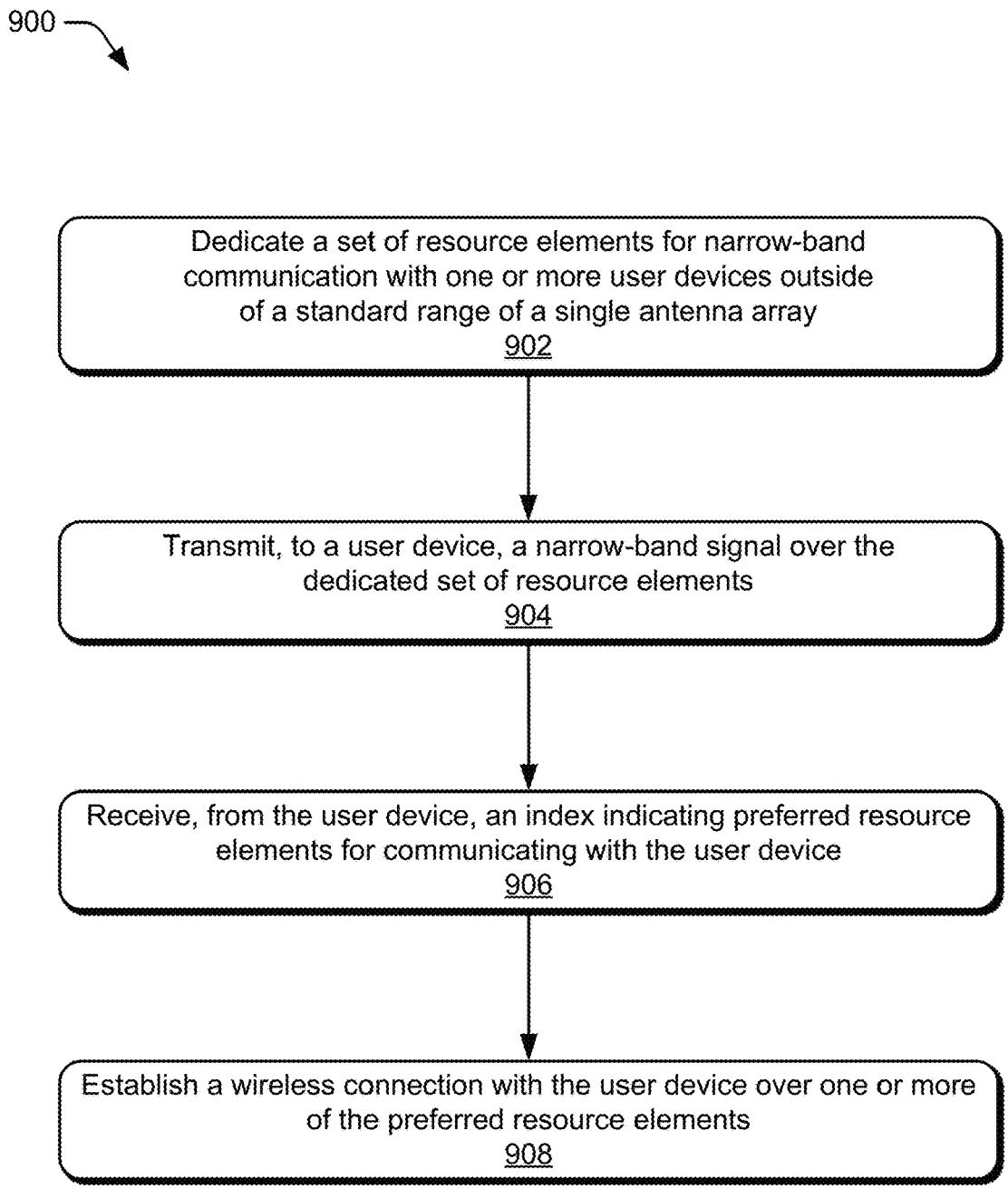
FIG. 9 illustrates another example method for opportunistic beamforming.

FIGS. 7-9 depict methods for implementing opportunistic beamforming in wireless networks. These methods are shown as sets of blocks that specify operations performed but are not necessarily limited to the order or combinations shown for performing the operations by the respective blocks. For example, operations of different methods may be combined, in any order, to implement alternate methods without departing from the concepts described herein. In portions of the following discussion, the techniques may be described in reference to FIGS. 1-6, reference to which is made for example only. The techniques are not limited to performance by one entity or multiple entities operating on one device, or those described in these figures.

FIG. 7 illustrates an example method 700 for opportunistic beamforming, including operations performed by a signal analysis module, such as the signal analysis module 116, and a communication module, such as the communication module 120. In some aspects, operations of the method 700 may be implemented to improve a signal-quality of a wireless connection for a user device that is outside of a range of a single antenna array of a single base station.

At operation 702, the user device receives a signal from a plurality of antenna arrays of one or more base stations. The signal is transmitted over a set of dedicated communication resources. For example, the user device 102 monitors a set of resource elements to detect and receive the signal components 208 and 210 from the base stations 104 and 202, respectively. In other examples, the user device 102 receives a signal from two or more antenna arrays at a single base station. The dedicated communication resources may include one or more resource blocks of the set 400 of resource blocks.

At operation 704, the user device generates an index indicating preferred resources of the dedicated communication resources. The preferred resources are determined based on a quality of the signal over the preferred resources. For example, the user device 102 analyzes a signal-quality of the signal over the one or more resource blocks of the set 400 of resource blocks. The user device 102 then generates the index 212 to indicate the preferred resources to the base station 104. In some implementations, the user device 102 communicates the index 212 via a PRACH.

At operation 706, the user device communicates the index to the one or more base stations such that the index is useable by the one or more base stations to establish a narrow-band wireless connection with the user device. For example, the user device 102 transmits, via the communication module 120, the indices 212 and 214 to the base stations 104 and 202. The base stations 104 and 202, or the MME 206, can then transmit scheduling information to the user device 102 to establish the wireless connection 106.

At optional operation 708, the user device 102 establishes the narrow-band wireless connection with the one or more base stations. For example, the communication module 120 receives scheduling information from the base stations 104 or 202 and begins communicating with the base stations 104 and 202 over scheduled resources.

At optional operation 710, the user device determines that a predetermined amount of time has passed since a most recent transmission to the one or more base stations. For example, the user device 102 has been idle for a predetermined amount of time. The predetermined amount of time may be based on an expected amount of time to travel a distance that would change a preference of resources.

At optional operation 712, the user device transmits, to the one or more base stations, an uplink maintenance signal. The uplink maintenance signal may include an SRS that includes a new index of preferred resources for communicating with the base stations 104 and 202. In some implementations, the user device 102 determines that a second, longer period of time has elapsed since a most recent transmission, not including maintenance signals, and discontinues periodic transmissions of uplink maintenance signals. When the user device 102 attempts to transmit again, the process of opportunistic beamforming is initiated again to establish preferred resources for communicating with the base stations 104 and 202, or other base stations of the wireless network.

FIG. 8 illustrates an example method 800 for opportunistic beamforming, including operations performed by a signal analysis module, such as the signal analysis module 116, and a communication module, such as the communication module 120. In some aspects, operations of the method 800 may be implemented to improve a signal-quality of a wireless connection for a user device that is outside of a range of a single antenna array of a single base station.

At operation 802, the user device receives a signal from a plurality of antenna arrays of one or more base stations. The signal is transmitted over a set of resource elements dedicated for narrow-band communication with one or more devices outside of a standard range of a single antenna array. For example, the user device 102 receives the signal components 208 and 210 from antenna arrays of the base stations 104 and 202. The base stations 104 and 202 transmit the signal components 208 and 210 over a set of dedicated resource elements such as the set 414 of resource blocks of FIG. 4. The dedicated resource elements may include a narrow-band of the set 414 of resource blocks, such as the subcarriers 506, 508, and the portion of the subcarrier 510 of the resource block 422 as shown in FIG. 5.

At operation 804, the user device generates an index indicating preferred resource elements of the set of resource elements. The resource elements are preferred based on a quality of the signal over the preferred resource elements. For example, the signal analysis module 116 analyzes a total signal that includes a superposition of the signal components 208 and 210. The signal analysis module 116 identifies preferred resource elements based on a signal-quality of the total signal over the set of resource elements. In some implementations, the signal analysis module 116 identifies preferred resource elements as those that exceed a threshold signal-quality. Additionally or alternatively, the signal analysis module 116 prioritizes the preferred resource elements based on the signal-quality of the total signal over the preferred resource elements.

At optional operation 806, the user device selects a PRACH sequence corresponding to the index generated in operation 804. For example, PRACH sequences are partitioned into sequence pools with the sequence pools corresponding to different indices. The signal analysis module 116 randomly selects a PRACH sequence from the sequence pool corresponding to the index indicating the preferred resource elements.

At operation 808, the user device communicates, via a PRACH communication, the index to the one or more base stations. The index is communicated to the one or more base stations via the plurality of antenna arrays, which communication may be beamformed to the antenna arrays. The index is configured to be useable by the one or more base stations to establish a narrow-band wireless connection with the user device. For example, the user device 102 transmits the indices 212 and 214 to the base stations 104 and 202. The base stations 104 and 202 may use respective antenna arrays for beamforming to receive the indices 212 and 214 from the user device 102. The base stations 104 and 202, or the MME 206, can decode the communication, if necessary, and use the index to determine a set of resources for establishing a narrow-band wireless connection with the user device 102. For example, the MME 206 can schedule the narrow-band wireless connection over one or more of the preferred resource elements. Additionally or alternatively, the MME can schedule the narrow-band wireless connection over one or more other resources based on the preferred resource elements. For example, the one or more other resources may have a same frequency or a same time slot as the preferred resource elements. In some implementations, the one or more other resources are near the preferred resource elements in a frequency-time location.

At operation 810, the user device establishes the narrow-band wireless connection with the one or more base stations. For example, the user device 102 receives a scheduling assignment from one or more of the base stations 104 or 202. The user device 102 can then begin transmitting and receiving data over the assigned resource elements.

FIG. 9 illustrates an example method 900 for opportunistic beamforming, including operations performed by a resource manager, a beamforming module, and a communication module, such as the resource manager 126 the beamforming module 128, and the communication module 130. In some aspects, operations of the method 900 may be implemented to improve a signal-quality of a wireless connection for a user device that is outside of a range of a single antenna array of a single base station.

At operation 902, a base station of a wireless network dedicates a set of resource elements for communication with one or more user devices outside of a standard range of a single antenna array. The dedicated set of resource elements can be a same set of resource elements as dedicated by another base station. For example, the base station 104 dedicates the set 414 of resource blocks for communication with the user device 102. The base station 202 can also dedicate the same set 414 of resource blocks for beamforming a signal to the user device 102.

At operation 904 the base station transmits, to the user device, a narrow-band signal over the dedicated set of resource elements. The narrow-band signal includes a portion, but not all of, at least one resource block. For example, one or more, but not all, subcarriers of the resource blocks of the set 414 of resource blocks are used to transmit the narrow-band signal. The narrow-band signal may include a CSI reference signal having a low duty cycle.

At operation 906, the base station receives, from the user device, an index indicating preferred resource elements for communicating with the user device. For example, the base station 104 receives the index 212 from the user device 102, which indicates preferred resource elements. The index 212 may be received, for example, as an SRS or a PRACH communication.

At operation 908, the base station establishes a wireless connection with the user device over one or more of the preferred resource elements. For example, the base station 104 communicates an assignment of resources for communication between the base station 104 and the user device 102. The assignment includes preferred resources as indicated by the index 212. In some implementations, the index indicates a preference for particular resource blocks. In other implementations, the index indicates a preference for any resource block operating at a preferred frequency or time slot. The wireless connection may be established as a narrow-band wireless connection in which data is communicated between the user device 102 and the base station 104 using fewer than all resource elements of one or more resource blocks.

Although techniques using, and apparatuses for implementing, opportunistic beamforming have been described in language specific to features or methods, it is to be understood that the subject of the appended claims is not necessarily limited to the specific features or methods described. Rather, the specific features and methods are disclosed as example ways in which opportunistic beamforming can be implemented.

What is claimed is:

1. A method for opportunistic beamforming performed by a user device, the method comprising:
   receiving a signal over a set of dedicated narrow-band communication resources, the signal including signal components from a plurality of base stations;
   analyzing the signal to determine a quality of the signal for each of the dedicated narrow-band communication resources;
   generating an index indicating preferred narrow-band communication resources for communicating with the plurality of base stations, the generating based on the determined quality of the signal for each of the dedicated narrow-band communication resources; and
   communicating the index to one of the plurality of base stations, the index usable by the one of the plurality of base stations to establish, in conjunction with others of the plurality of base stations, a beamformed narrow-band wireless connection with the user device using one or more of the preferred narrow-band communication resources that comprise fewer than all resource elements of one resource block.

2. The method as recited in claim 1, wherein the generating the index comprises:
   selecting the preferred narrow-band communication resources based on a comparison of a signal-quality threshold with the quality of the signal received over each of the dedicated narrow-band communication resources.

3. The method as recited in claim 1, wherein:
   the receiving the signal comprises:
      receiving the signal over a fifth-generation new radio wireless network; and
   the communicating the index comprises:
      communicating the index over the fifth-generation new radio wireless network.

4. The method as recited in claim 1, further comprising:
   communicating the index to the others of the plurality of base stations.

5. The method as recited in claim 1, wherein the user device is outside of a standard range for communicating with a single base station of the plurality of base stations over the set of dedicated narrow-band communication resources.

6. The method as recited in claim 1, further comprising:
   establishing the beamformed narrow-band wireless connection with the plurality of base stations, wherein the beamformed narrow-band wireless connection uses a plurality of the preferred narrow-band communication resources.

7. The method as recited in claim 1, further comprising:
   determining that a predetermined amount of time has passed since a most recent transmission to the one of the plurality of base stations; and
   transmitting, to the one of the plurality of base stations, an uplink maintenance signal.

8. The method as recited in claim 1, wherein the communicating the index comprises:
   transmitting a sounding reference signal over one or more of the preferred narrow-band communication resources.

9. A user device comprising:
   at least one hardware-based transceiver; and
   at least one computer-readable storage media device comprising instructions that are executable to cause the user device to:
      receive a signal over a set of dedicated narrow-band communication resources, the signal including signal components from a plurality of base stations;
      analyze the signal to determine a quality of the signal for each of the dedicated narrow-band communication resources;
      generate, based on the determined quality of the signal for each of the dedicated narrow-band communication resources, an index indicating preferred narrow-band communication resources for communicating with the plurality of base stations; and
      communicate the index to one of the plurality of base stations, the index useable by the one of the plurality of base stations to establish, in conjunction with others of the plurality of base stations, a beamformed narrow-band wireless connection with the user device using one or more of the preferred narrow-band communication resources that comprise fewer than all resource elements of one resource block.

10. The user device as recited in claim 9, wherein the instructions are further executable to cause the user device to:
    determine a location of the set of dedicated narrow-band communication resources; and
    monitor the set of dedicated narrow-band communication resources to detect the signal.

11. The user device as recited in claim 9, wherein the instructions are further executable to cause the user device to:
    select a physical random access channel (PRACH) sequence corresponding to the index; and
    communicate the index to the one of the plurality of base stations by transmitting the selected PRACH sequence to the one of the plurality of base stations.

12. The user device as recited in claim 9, wherein the instructions are further executable to cause the user device to:
    establish the beamformed narrow-band wireless connection with the plurality of base stations.

13. The user device as recited in claim 9, wherein the instructions are further executable to cause the user device to:
    communicate the index to the one of the plurality of base stations by transmitting a sounding reference signal over the preferred narrow-band communication resources.

14. The user device as recited in claim 9, wherein the instructions are further executable to cause the user device to:
    communicate the index to the others of the plurality of base stations.

15. The user device as recited in claim 9, wherein communicating the index comprises:
    communicating the index over a physical random access channel.

16. A first base station comprising:
    at least one hardware-based transceiver; and
    at least one computer-readable storage media device comprising instructions that are executable to cause the first base station to:
       determine a dedicated set of resource elements for narrow-band communication for communicating with user devices that are outside of a standard communication range of the first base station using the dedicated set of resource elements for narrow-band communication;

synchronize with a second base station such that the second base station can transmit a second narrow-band signal component over the dedicated set of resource elements for narrow-band communication concurrently with a first narrow-band signal component sent by the first base station over the dedicated set of resource elements for narrow-band communication;

transmit, to a user device, the first narrow-band signal component over the dedicated set of resource elements for narrow-band communication for combination with the second narrow-band signal component over the dedicated set of resource elements for narrow-band communication;

receive, from the user device or the second base station, an index indicating preferred resource elements for narrow-band communication; and establish, with the second base station and based on the index, a beamformed wireless connection with the user device over one or more of the preferred resource elements of the dedicated set of resource elements for narrow-band communication, a number of the one or more of the preferred resource elements of the dedicated set of resource elements for narrow-band communication being less than a number of resource elements of one resource block.

17. The first base station as recited in claim 16, wherein the instructions are further executable to cause the first base station to:
  beamform, in conjunction with the second base station, a downlink transmission to the user device over the one or more of the preferred resource elements.

18. The first base station as recited in claim 16, wherein:
  the one or more of the preferred resource elements comprise a plurality of the preferred resource elements; and
  the one or more of the preferred resource elements are within a plurality of resource blocks.

19. The first base station as recited in claim 16, wherein the instructions are further executable to cause the first base station to:
  receive the index by receiving the index over a physical random access channel (PRACH).

20. The first base station as recited in claim 16, wherein the instructions are further executable to cause the first base station to:
  receive the index by receiving a sounding reference signal component over the preferred resource elements.

* * * * *